United States Patent [19]
Prell et al.

[11] 3,718,385
[45] Feb. 27, 1973

[54] APPARATUS FOR MOUNTING AN OPTICAL CORRECTION MEMBER IN A HOUSING

[75] Inventors: Gunter Prell, Wedel/Hostein; Herbert Baersch, Hamburg, both of Germany

[73] Assignee: Licentia Patent-Verwaltungs-G.m.b.H., Frankfurt am Main, Germany

[22] Filed: July 21, 1971

[21] Appl. No.: 164,674

[30] Foreign Application Priority Data

July 24, 1970 Germany.....................P 20 36 789.9

[52] U.S. Cl. ................350/252, 178/7.89, 178/7.91, 350/243, 350/67
[51] Int. Cl. ..............................................G02b 7/02
[58] Field of Search......350/245, 252, 250, 255, 257, 350/67, 57; 178/7.85, 7.89, 7.9, 7.91

[56] References Cited

UNITED STATES PATENTS

| | | | |
|---|---|---|---|
| 2,585,746 | 2/1952 | Davis et al. | 178/7.89 |
| 3,390,931 | 7/1968 | Luning | 350/57 |

FOREIGN PATENTS OR APPLICATIONS

| | | | |
|---|---|---|---|
| 777,648 | 6/1957 | Great Britain | 350/67 |

Primary Examiner—David Schonberg
Assistant Examiner—Michael J. Tokar
Attorney—Spencer & Kaye

[57] ABSTRACT

Apparatus for automatically adjusting a correction lens for an image processing tube of a viewing instrument in which the lens is axially aligned with a photocathode of the tube, including a resilient diaphragm which is mounted in a prestressed condition to thereby urge the lens toward the photocathode while automatically maintaining the axial alignment between the lens and the photocathode.

6 Claims, 1 Drawing Figure

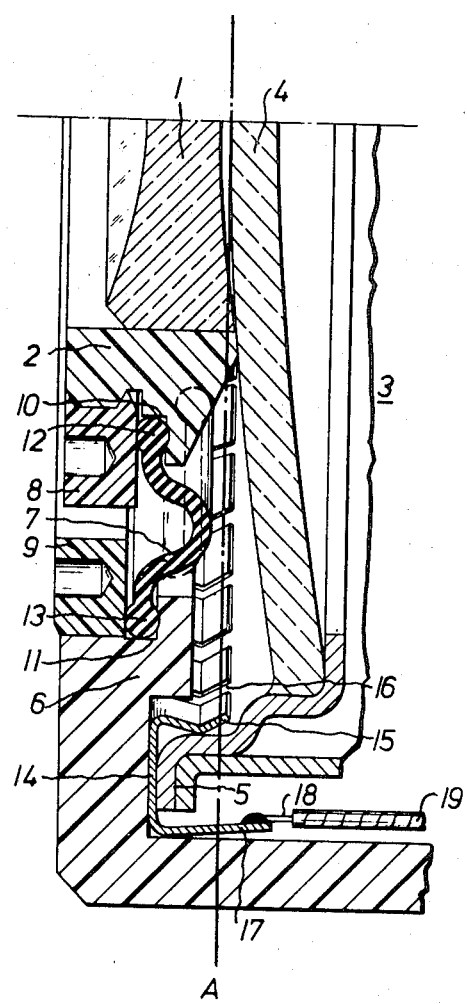

APPARATUS FOR MOUNTING AN OPTICAL CORRECTION MEMBER IN A HOUSING

BACKGROUND OF THE INVENTION

The present invention relates to adjustment apparatus, and more particularly to an adjustment apparatus for a mounted correction lens which is axially aligned with the photocathode of an image converter or image amplifier tube (hereinafter referred to as an image processing tube) to thereby automatically maintain the axial alignment of the lens and the photocathode.

In a viewing instrument provided with an image processing tube, the focused reproduction of an observed scene on the photocathode of the tube requires an optical correction member, for example a lens, to be mounted ahead of the tube. This lens must be disposed at a certain, fixed distance from the photocathode so that the viewing instrument will furnish a good and sharp image of the scene under observation at all times.

In such instruments high voltages are applied to the photocathode of the tube, so that the elements surrounding the photocathode must be electrically insulated. For this reason the housing of the viewing instrument as well as the mount for the lens are made of a material capable of insulating against high voltages such as, for example, a plastic material.

Also in such instruments, dimensional variations occur during the manufacture of the processing tubes, for example, the longitudinal or axial dimensions sometimes vary. As a result, the lens with its mount, which is fastened thereto so that the proper dimension with respect to the housing and photocathode is initially established, must be so arranged that its position can be subsequently adjusted relative to the housing so that, for any tube, the given distance between lens and photocathode can be exactly set.

Previously such a fine adjustment was obtained by a thread adjustment. The mount was held in the threads of a housing and the given distance between the lens and the photocathode was set by appropriately screwing the mount in or out. The drawback of this procedure, however, is that the screwing process often produces centering errors for the lens with respect to the photocathode. Moreover, no dependable high voltage insulation is possible since leakage currents could always occur in the thread passages. This occurrence is noted particularly when, during the replacement of the processing tube in the viewer, the lens mount requires adjustment.

This adjustment is also very complicated and expensive, because the viewer must be opened and the adjustment of the lens mount must be made inside the housing by means of special tools.

SUMMARY OF THE INVENTION

It is, therefore, an object of the present invention to overcome the above-mentioned drawbacks. It is a more particular object of the present invention to provide a mount for a correction lens, a housing and an adjusting device which offers dependable insulation against high voltages while at the same time the adjusting device automatically adjusts itself to dimensional differences of the tubes while maintaining the axial alignment of the correction lens with respect to the tube.

These and other objects are accomplished according to the present invention by the provision of a diaphragm which consists of a resilient and high voltage resistant material such as silicon rubber and which is clamped between the housing and the mount of the correction lens. The ends of the diaphragm are fastened in recesses of the housing and of the mount by means of screwable clamping rings so that the diaphragm is prestressed to thereby urge the mount toward the photocathode.

An advantage derived by the present invention is that during exchange of a tube the lens fastened in its mount is automatically urged toward the photocathode of the tube by the prestressed diaphragm so that the distance between the photocathode and the lens is always maintained as desired without requiring special correcting measures. At the same time the device according to the present invention eliminates centering errors as they might occur from screwing, and dependable high voltage insulation is assured.

BRIEF DESCRIPTION OF THE DRAWING

The single drawing FIGURE shows a partial cross-sectional view in elevation of the adjusting diaphragm of the present invention secured between the correction lens mount and the housing.

DESCRIPTION OF THE PREFERRED EMBODIMENT

The Figure shows an optical correction member 1, for example a lens, disposed in front of a photocathode 4 of an image processing tube 3. The lens 1 is fastened on the mount 2, for example by cementing, at a precise position so that when the mount 2 is in contact with the photocathode 4 the desired distance between the photocathode and the lens 1 is assured. The mount 2 is held in a housing 6 by means of a resilient annular diaphragm 7, which is fastened with its peripheral edges 12 and 13 in recesses 10 and 11, respectively, of the mount 2 and the housing 6. The diaphragm 7 is retained in the recesses 10 & 11 by means of clamping rings 8 and 9, respectively. The housing 6 supports current-conducting parts 5 of the high-voltage photocathode 4 of the image processing tube 3 by means of a [ -shaped annular contact 14. The radially innermost leg 15 of the annular contact 14 shows axially directed slits 16 forming tongues spaced apart circumferentially and when dismounted has an outer diameter which is greater than the inner diameter of the current-conducting parts 5. When installing the image processing tube 3 the elastic tongues of the innermost leg 15 are radially forced inside by the parts 5, thus concentrically supporting, because of their prestressed state, the image processing tube 3 in the housing 6.

Simultaneously the annular contact 14 consisting of an electrically conducting metallic material serves to conduct the high voltage required for operating the image processing tube 3. For that purpose a conductor 18 of a high-voltage cable 19 is soldered to the radially outermost leg 17 of the annular contact 14. Moreover, the surface of the annular contact 14 is gilded for the purpose of better current-conducting characteristics.

The annular diaphragm 7 as well as the mount 2, housing 6 and clamping rings 8 and 9 are made of a high voltage insulating plastic material so that sufficient insulation is provided with respect to the current-conducting parts 5 of the high voltage photocathode 4 of the image processing tube 3.

The forces required for holding and adjusting the mount 2 of the lens 1 in the axial and radial directions result from the elastic property of the annular diaphragm 7. In an unstressed state, i.e., if the radially innermost edge 12 of the diaphragm 7 is free and not retained in the recess 10 of the mount 2, the annular diaphragm 7 shows the position represented by the dotted line. The diaphragm 7 is a shaped piece of silicon rubber with a Shore hardness of 45±5, which contains a small quantity of soot only (to ensure a high dielectric strength), and is installed in a prestressed state in that its edges 12 and 13 are forced toward one another. The prestressing is achieved by the radial compression of a diaphragm and by the fact that the edge 12 is axially displaced by the ring 8 to be closer to the plane A tangent to the photocathode surface and normal to its axis than the edge 13 so that the radial restoring force existing in diaphragm 7 and extending between edges 12 and 13 is given an axial component which urges mount 2 toward photocathode 4. Because of its prestressing, the diaphragm presses the mount 2, with the lens 1, against the photocathode 4 of the tube 3 while maintaining the axial alignment therebetween. Consequently, if the tube 3 is replaced by a tube which differs dimensionally, the proper axial alignment and lens-to-photocathode distance will be maintained.

The present invention is particularly advantageous since viewers of the type involved are designed to permit the replacement of the tube 3 to be performed rapidly and simply by the user, whereupon the correct spacing between the lens 1 and the photocathode 4 is now automatically established.

It will be understood that the above description of the present invention is susceptible to various modifications, changes and adaptations, and the same are intended to be comprehended within the meaning and range of equivalents of the appended claims.

We claim:

1. In a viewing instrument including a housing, an image processing tube supported by said housing, a photocathode supported by said tube, a correction lens and means for mounting said correction lens so that said lens is axially aligned with respect to said photocathode, the improvement comprising a resilient adjusting diaphragm positioned between said mounting means and said housing in a prestressed condition for urging said mounting means toward said photocathode so as to automatically establish a predetermined distance between said lens and said photocathode while automatically maintaining the axial alignment between said lens and said photocathode.

2. An arrangement as defined in claim 1, wherein said diaphragm is annular and of a high-voltage insulating material.

3. An arrangement as defined in claim 2, wherein said diaphragm is of silicon rubber.

4. An arrangement as defined in claim 2, further comprising means for retaining said diaphragm in its prestressed condition.

5. An arrangement as defined in claim 4, wherein said retaining means comprise a pair of clamping rings.

6. An arrangement as defined in claim 5, wherein each clamping ring engages a different one of the edges of said diaphragm for placing the radially innermost edge closer to said photocathode than the radial outermost edge.

* * * * *